United States Patent
Gibbs et al.

[11] 3,711,063
[45] Jan. 16, 1973

[54] ANTI-REVERSE FLOW VALVE

[76] Inventors: John L. Gibbs, 14820 Miami Lakeway East; James W. Gibbs, 8027 West 14th Avenue, both of Hialeah, Fla.

[22] Filed: Oct. 8, 1971

[21] Appl. No.: 187,754

[52] U.S. Cl. ............................... 251/276, 137/542
[51] Int. Cl. ............................................... F16k 31/50
[58] Field of Search .......... 251/274, 275, 276, 82, 83; 137/329.06, 137-540, 542, 543.13, 543.15

[56] References Cited

UNITED STATES PATENTS

| | | | |
|---|---|---|---|
| 630,949 | 8/1899 | Thummel | 251/83 |
| 862,752 | 8/1907 | Pennell | 137/329.06 |

*Primary Examiner*—Martin P. Schwadron
*Assistant Examiner*—David R. Matthews
*Attorney*—Salvatore G. Militana

[57] ABSTRACT

An anti-reverse flow valve for bibcocks, hose bibs, faucets and the like having a pair of telescopically mounted valve stems, the outer valve stem having an axially disposed bore forming a guide for the inner valve stem, the latter having longitudinally disposed grooves on its periphery preventing the creation of a vacuum in the bore upon the sliding movement of the inner valve stem. The bore receives a coil spring which yieldingly urges the main valve mounted on the inner valve stem to seat on an elevated valve seat whereby upon threading the outer valve stem to open the main valve, the pressure of water causes the inner valve stem to slide inwardly of the outer valve stem against the coil spring pressure and permit the discharge of water therethrough. Upon the loss of water pressure the coil spring causes the main valve having a peripheral depending skirt portion to be brought to seat instantaneously on the elevated valve seat with the skirt portion engaging the base of the valve seat to prevent a reverse flow of water.

2 Claims, 6 Drawing Figures

INVENTORS
JOHN L. GIBBS
JAMES W. GIBBS
BY Salvatore G. Militano
ATTORNEY

ANTI-REVERSE FLOW VALVE

CROSS REFERENCES TO RELATED APPLICATIONS

This invention is an improvement over applicants' copending application Ser. No. 44,079, filed on June 8, 1970 now U.S. Pat. No. 3,662,988, for Anti-Reverse Flow And Syphon Breaker Valve Assembly.

BACKGROUND OF THE INVENTION

1. Field of the Invention

This invention relates directly to fluid flow control devices and is more particularly directed to a valve assembly that operates to prevent the reverse flow of fluid therethrough to prevent the contamination of the fluid at its source.

2. Description of the Prior Art

Flow control valves which prevent the reverse flow of liquid are presently complicated in design and relatively high in cost. Consequently such valves are utilized in only those situations as in the control of water and the like wherein the danger of contamination is imminent or highly likely in occurence. The local ordinances normally define those situations in which an anti-reverse flow valve must be used leaving unprotected by possible contamination caused by the usual household hose bibs, bib cocks, faucets, etc. The latter are not presently provided with any anti-reverse flow control valves, but merely have a conventional valve that opens upon turning the valve handle in one direction and ssealing or closing when the handle is rotated the reverse direction indicating a dire need for a relatively inexpensive yet effective anti-reverse flow control valve so that all outlets for water, etc. may be protected against contamination due to a reverse flow caused by a drop in water pressure or an increase in pressure at the discharge point.

SUMMARY OF THE INVENTION

Accordingly a primary object of the present invention is to provide a simple, effective and relatively inexpensive anti-reverse flow valve for fluids such as water and the like wherein there is danger of contamination due to a reverse flow therethrough.

Another object of the present invention is to provide an anti-reverse flow valve which offers no more restriction to the flow of water than does the conventional valve, but upon the dropping of fluid pressure at its source or upon the increase of pressure on the discharge side of the valve, the valve will seat instantaneously to prevent any reverse flow therethrough.

A further object of the present invention is to provide an anti-reverse flow valve with telescopically mounted valve stems, the inner valve stem on which the valve is mounted being fluted to prevent the creation of a vacuum and the consequent malfunctioning of the valve and having a coil spring secured to the end of the inner valve stem so that it cannot become separated therefrom.

A still further object of the present invention is to provide an anti-reverse flow valve wherein the valve disk having a peripheral skirt portion engages the bottom wall of an elevated valve seat when the valve comes to a closed position whereby flow of water therealong is effectively cut off in spite of any foreign matter, scale, dirt, etc. may become lodged on the valve.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

DESCRIPTION OF THE PREFERRED EMBODIMENT

Figure 1:
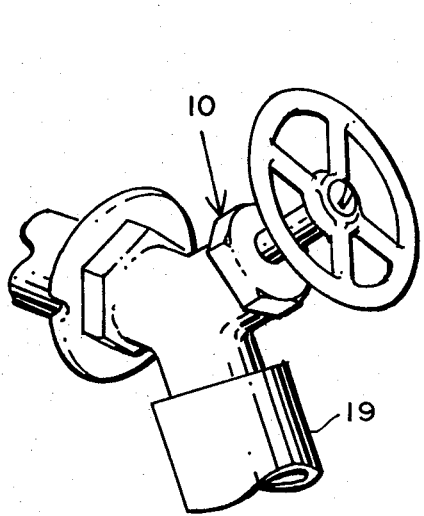
FIG. 1 is a perspective view of a bibcock constructed in accordance with our invention.
Figure 6:
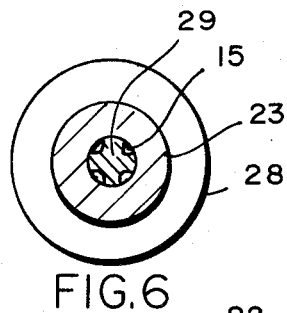
FIG. 6 is a cross sectional view taken along the line 6—6 of FIG. 4.

Referring to the drawing wherein like numerals are used to designate similar parts throughout the several views, the numeral 10 refers to a bib cock constructed in accordance with our invention, the bib cock 10 being shown only by way of illustration since any valved device wherein the danger of contamination by a reverse flow of liquid may be used.

The bib cock 10 is provided with an inlet duct 12, an outlet duct 13 and a valve chamber 14 which communicates with the inlet 12 and outlet 13 to permit the flow of fluid therethrough. A pipe 17 which is connected to the bib cock 10 at the inlet 12 permits fluid to flow from a source (not shown) past the valve assembly 11 when in an open position to be discharged through the outlet 13 and a discharge pipe 19 that is connected thereto.

The inlet duct 12 joins the valve chamber 14 in an elevated valve seat 19 that is in alignment with an internally threaded open portion 20 whose outer surface is provided with threads 21 for receiving a cap 22. The cap 22 seals the open end of the valve chamber 14 while the internal threads 20 receive a plug 23 when rotated by a handle 24 opens and closes the valve assembly 11. A stem 25 which extends through an opening 26 in the cap 22 joins the plug 23 and the handle 24 for unitary rotational movement thereof. The stem 25 and plug 23 are provided with an axially disposed bore 27 that extends from a base 28 and terminating at 37 spaced from the end of the stem 25.

Figure 5:
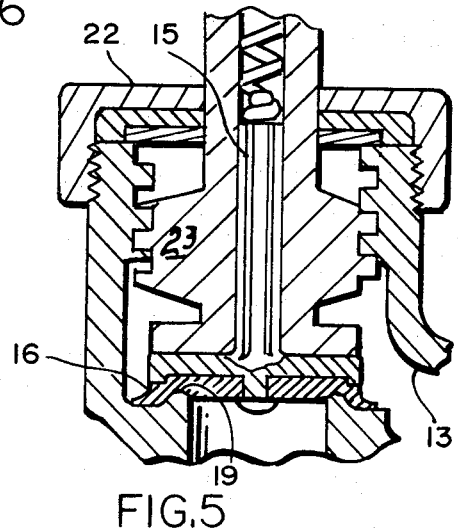
FIGS. 4 and 5 are fragmentary cross sectional views of the structure of FIG. 3 showing the progressive closing of the valve to prevent the reverse flow of fluid therethrough.
Figure 4:
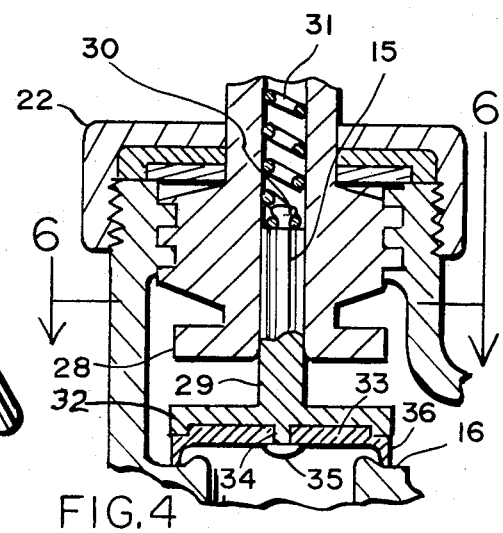

Slidably mounted in the bore 27 is a valve stem 29 that is provided with longitudinally disposed grooves 15 along its periphery with a spring retaining member 30 mounted at its upper end to which a coil spring 31 is attached. The coil spring 31 yieldingly urges the stem 29 to slide in an outward direction of the bore 27 while the grooves 15 permit the flow of fluid in and out of the bore 27 to prevent the creation of a vacuum therein. The elevated valve seat 19 is provided with a crown positioned above a bottom wall 16. At the lower end of the valve stem 29 is a cup shaped inflexible valve body 32 in which is mounted a resilient valve disk 33. The valve disk 33 is provided with a centrally disposed bore 34 through which a rivet type fastener 35 extends for fastening the valve disk 33 to the valve body 32. To permit an effective seal when the valve disk 33 is seated on the elevated valve seat 19, the valve disk 33 is provided with a circular skirt 36 that engages the bottom wall 16 of the valve seat 19 as the valve disk 33 engages the crown of the valve seat 19 as best shown by FIGS. 4 and 5.

In the normal use of the hose bib 10, the pipe 17 is connected to a source of water, for example, while the discharge pipe 19 is connected to a point of use wherein the water may become contaminated. With the handle rotated to slide the valve body 32 inwardly to seat the valve disk 33 against the valve seat 19, the valve base member 28 will bear tightly against the valve body 32 and thereby prevent any flow of liquid therethrough. The function of our valve assembly 11 is to prevent any possible reverse flow of liquid, that will flow from the pipe 19 to the pipe 17 to contaminate the liquid supply and which can only occur when the valve assembly is in its open position and the pressure in the inlet pipe 17 falls below that of the liquid in the discharge pipe 19.

Figure 3:
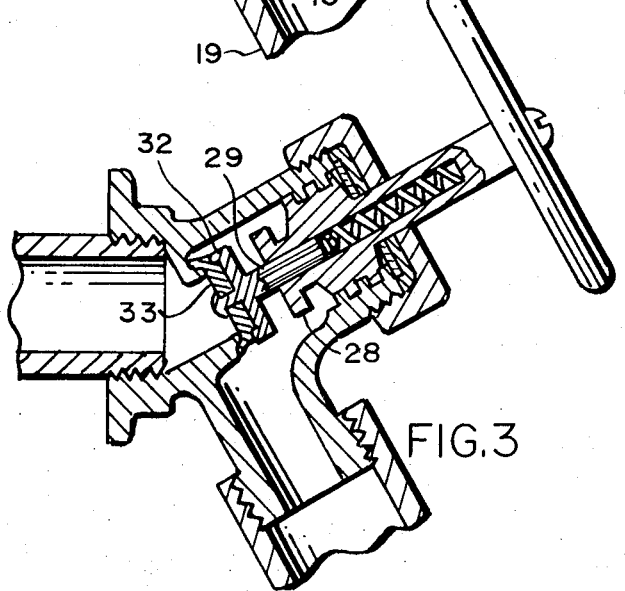
FIG. 3 is a similar view showing the valve seated as a result of a loss in fluid pressure at the source.

To permit the flow of liquid from the inlet pipe 17 to the discharge pipe 19, the valve handle 24 is rotated to slide the valve base member 28 in a direction away from the valve body 32 as shown by FIG. 3.

Figure 2:
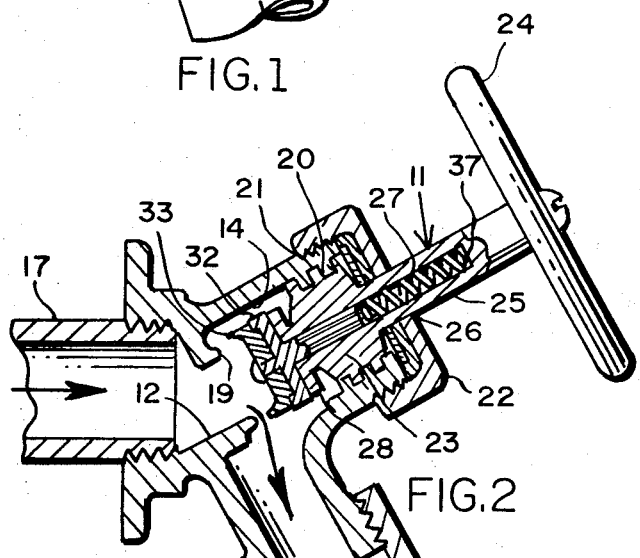
FIG. 2 is a longitudinal cross sectional view showing the valve assembly in an open position with water flowing therethrough in the direction shown by the arrow.

The coil spring 31 yieldingly forces the valve 33 to remain seated momentarily as the valve handle 24 is actuated to its open position. If there is liquid under pressure at the inlet 12, the water pressure will force the valve body 32 and valve disk 33 to slide upwardly away from the valve seat 19 against coil spring pressure 31 and permit the flow of liquid therethrough, as shown by FIG. 2.

Should the pressure in the inlet 12 drop suddenly or the pressure in the outlet 13 become higher than that at the inlet 12, the spring pressure will cause the valve stem 29 to slide downwardly in the bore 27 to cause the valve disk 33 to become seated in the valve seat 19. As best shown by FIG. 5, the skirt 36 of the valve disk 33 engages the bottom wall 16 of the elevated seat 19 while the face of the valve disk 33 engages the upper surface or crown of the valve seat 19 to thereby secure against any possible reverse flow of liquid in the valve chamber 14. Consequently no liquid which may have been contaminated at the outlet 19 can flow back through the inlet 12 to contaminate the liquid at the source of the inlet pipe 17.

Since the valve stem 29 is fluted by means of the longitudinal slots 15, liquid will flow freely in and out of the bore 27 when the valve assembly 11 is in an open position. Consequently, a vacuum cannot be created in the bore 27 above the stem 29. Such a vacuum which would result if the stem 29 fit snugly in the bore 27 would impair the proper functioning of the coil spring 31 in returning the valve assembly 11 to its closed position when an imbalance of pressures resulted in the pipe lines 17, 19 as explained hereinabove. In the event a pressure failure and a foreign particle such as scale, dirt and the like becoming lodged on the valve seat 19, the valve disk 33 and skirt 36 will seat themselves on and along the valve seat 19 as shown by FIG. 5 to seal against any leakage of liquid past the valve seat 19. Also, when the valve assembly 11 has to be removed from the bib cock 10, the coil spring 31 will remain attached to the inner valve stem 29 as the various parts are disassembled and consequently cannot be inadvertently dropped or lost in the piping system.

What we claim as new and desire to secure by Letters Patent of the United States is:

1. An anti-reverse flow valve comprising a housing having an inlet and an outlet opening and a valve chamber connecting said inlet and said outlet, an elevated valve seat mounted in said valve chamber at said inlet, said elevated valve seat having a peripheral crown portion and a base wall portion at the foot of said crown portion, said valve chamber having a threaded opening in substantial alignment with said valve seat, a plug threadedly mounted at said threaded opening in said housing, a cap threadedly mounted on said housing sealing said threaded opening and having a centrally disposed opening, a first stem mounted on said plug and extending through said cap opening for unitary rotation of said stem and said plug, a handle mounted on said stem, a base member mounted on the free end of said plug, said plug having a substantially centrally disposed bore extending from said base into said stem and terminating adjacent to the free end of said stem, a valve stem slidably mounted in said bore, said valve stem having longitudinally disposed slotted portions permitting flow of fluid to and from said valve chamber and said bore, a coil spring in said bore extending between said valve stem and the end of said bore yieldingly urging said valve stem outwardly of said plug, means securing said valve stem and said coil spring, a valve body mounted on the free end of said valve stem, a substantially resilient valve disk secured to said valve body, said valve disk having a substantially flat wall portion and a peripherally disposed side wall whereby upon the seating of said valve disk on said valve seat upon the creation of a higher pressure at said outlet than at said inlet, said peripheral side wall first engages said base wall of said valve seat and said flat wall portion engages said crown of said valve seat to seal said valve opening against a reverse flow of fluid therethrough.

2. The structure as recited by claim 1 wherein said coil spring securing means comprises a post mounted on said valve stem, said post having an enlarged head portion and said coil spring encircling said post and engaging said enlarged head portion.

\* \* \* \* \*